US008811023B2

(12) United States Patent
Sakurai et al.

(10) Patent No.: US 8,811,023 B2
(45) Date of Patent: Aug. 19, 2014

(54) ELECTRONIC DEVICE

(75) Inventors: Tomonori Sakurai, Kawasaki (JP); Jiro Takahashi, Kawasaki (JP); Chikara Kobayashi, Kato (JP)

(73) Assignee: Fujitsu Limited, Kawasaki (JP)

( * ) Notice: Subject to any disclaimer, the term of this patent is extended or adjusted under 35 U.S.C. 154(b) by 181 days.

(21) Appl. No.: 13/281,881

(22) Filed: Oct. 26, 2011

(65) Prior Publication Data

US 2012/0113604 A1     May 10, 2012

(30) Foreign Application Priority Data

Nov. 9, 2010    (JP) ................... 2010-251226

(51) Int. Cl.
| H05K 5/00 | (2006.01) |
| H04M 1/23 | (2006.01) |
| H04M 1/02 | (2006.01) |
| H01H 13/81 | (2006.01) |
| H01H 13/705 | (2006.01) |
| H01H 1/58 | (2006.01) |

(52) U.S. Cl.
CPC ......... *H01H 13/81* (2013.01); *H01H 2207/004* (2013.01); *H04M 1/23* (2013.01); *H04M 1/0237* (2013.01); *H01H 1/5822* (2013.01); *H01H 2223/0345* (2013.01); *H01H 13/705* (2013.01); *H01H 2221/002* (2013.01)
USPC ..................................... 361/752; 361/679.01

(58) Field of Classification Search
USPC .......... 361/600, 679.01, 679.55, 679.56, 748, 361/752
See application file for complete search history.

(56) References Cited

U.S. PATENT DOCUMENTS

| 5,813,520 | A | * | 9/1998 | Reier et al. ..................... 200/343 |
| 2002/0042853 | A1 | * | 4/2002 | Santoh et al. ..................... 710/8 |
| 2009/0086425 | A1 | * | 4/2009 | Lai et al. ..................... 361/679.56 |
| 2011/0134592 | A1 | * | 6/2011 | Mikami ..................... 361/679.01 |
| 2013/0077215 | A1 | * | 3/2013 | Tada et al. ................. 361/679.01 |

FOREIGN PATENT DOCUMENTS

JP     2007-109486 A     4/2007

\* cited by examiner

*Primary Examiner* — Bernard Rojas
(74) *Attorney, Agent, or Firm* — Fujitsu Patent Center

(57) ABSTRACT

An electronic device includes a case including a fixing portion, a printed board fixed to the fixing portion, a key rubber provided with key tops and fixed to the printed board, and a flexible cable attached to the printed board and bent in a direction different from the surface of the fixing portion to which the printed board is fixed, wherein the key rubber includes a contact portion that is in contact with the folded portion of the flexible cable and subjected to reaction force of the flexible cable, and a locking portion pressed against the case by the reaction force.

2 Claims, 10 Drawing Sheets

ELECTRONIC DEVICE

CROSS-REFERENCE TO RELATED APPLICATIONS

This application is based upon and claims the benefit of priority from the prior Japanese Patent Application No. 2010-251226 filed on Nov. 9, 2010, the entire contents of which are incorporated herein by reference.

FIELD

The embodiment discussed herein relates to an electronic device.

BACKGROUND

An electronic device such as a cellular phone is provided with various keys as an input interface of the device. A user depresses the keys, thereby performing various operations. It is known that electronic devices have a key structure including, for example, contact switches.

For example, a key structure including contact switches described in Japanese Laid-open Patent Publication No. 2007-109486 includes a printed board module and a key module disposed on the printed board module. The printed board module includes a printed board with an electronic circuit thereon, and contact switches disposed on the printed board. The key module has, for example, a key rubber and key tops disposed on the key rubber. The key rubber is an elastic member disposed on the printed board module.

The key rubber has planar portions, supporting portions, and pushers. The planar portions are disposed opposite to the contact switches. The supporting portions support the planar portions at locations on the printed board module where the contact switches are not provided. The pushers are protrusions formed at positions on the contact switch side surfaces of the planar portions corresponding to the contact switches. The key tops are placed on the surfaces of the planar portions opposite to the surfaces on which the pushers are formed. When a user depresses any one of the key tops, the corresponding planar portion bends, the corresponding pusher depresses the corresponding contact switch, and the contact switch is thereby turned on.

In the key structure described in Japanese Laid-open Patent Publication No. 2007-109486, a front case holds the key rubber, thereby preventing the key rubber from coming off. In place of the structure disclosed in Japanese Laid-open Patent Publication No. 2007-109486, a structure may be used in which, in a case of an electronic device, a printed board module is fixed to a placement plate integral with the case, the printed board module is thereby fixed to the case, a key rubber is bonded to the printed board module without placing a front case on the key rubber, key tops are bonded to the key rubber, and the key module is thereby fixed. In this case, the thickness of the case may be reduced.

In the case where a key flexible cable is used in order to electrically connecting an electronic circuit formed on a first printed board and an electronic circuit formed on a second printed board, the key flexible cable extends from one end thereof connected to the first printed board, and is folded on the outer side of the end face of a placement plate on which the first printed board is placed, and the other end of the key flexible cable is connected to the second printed board disposed, for example, on the reverse side of the placement plate.

If another member, such as a slide module of a cellular phone, is provided in the direction in which the folded portion of the key flexible cable bends due to its own weight, the folded portion may come into contact with the other member and may be pressed toward the key rubber. In this case, the folded portion pressed by the other member presses the key rubber, and as a result, the key rubber may peel off of the printed board module.

SUMMARY

According to an aspect of the embodiment, an electronic device includes a case including a fixing portion, a printed board fixed to the fixing portion, a key rubber provided with key tops and fixed to the printed board, and a flexible cable attached to the printed board and bent in a direction different from the surface of the fixing portion to which the printed board is fixed, wherein the key rubber includes a contact portion that is in contact with the folded portion of the flexible cable and subjected to reaction force of the flexible cable, and a locking portion pressed against the case by the reaction force.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the electronic device disclosed in the present application will now be described in detail with reference to the drawings. The disclosed technique is not limited to these embodiments. For example, although in the following embodiments a cellular phone is taken as an example of an electronic device, the following embodiments may be applied not only to a cellular phone but also to an electronic device such as a PDA (Personal Digital Assistant).

[First Embodiment]

Figure 1:
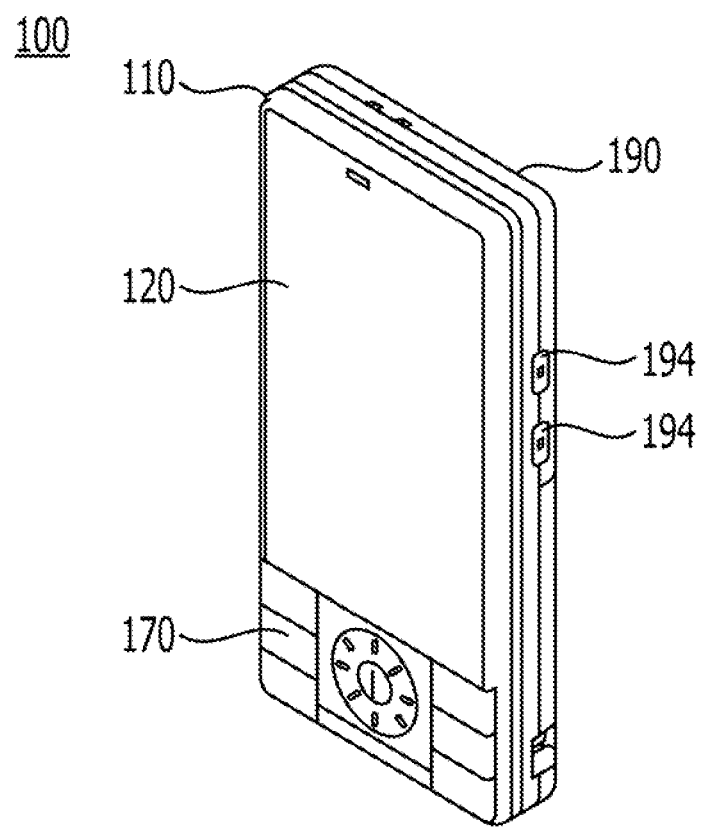
FIG. 1 is a perspective view illustrating the appearance of a cellular phone of a first embodiment in a closed state.
Figure 2:
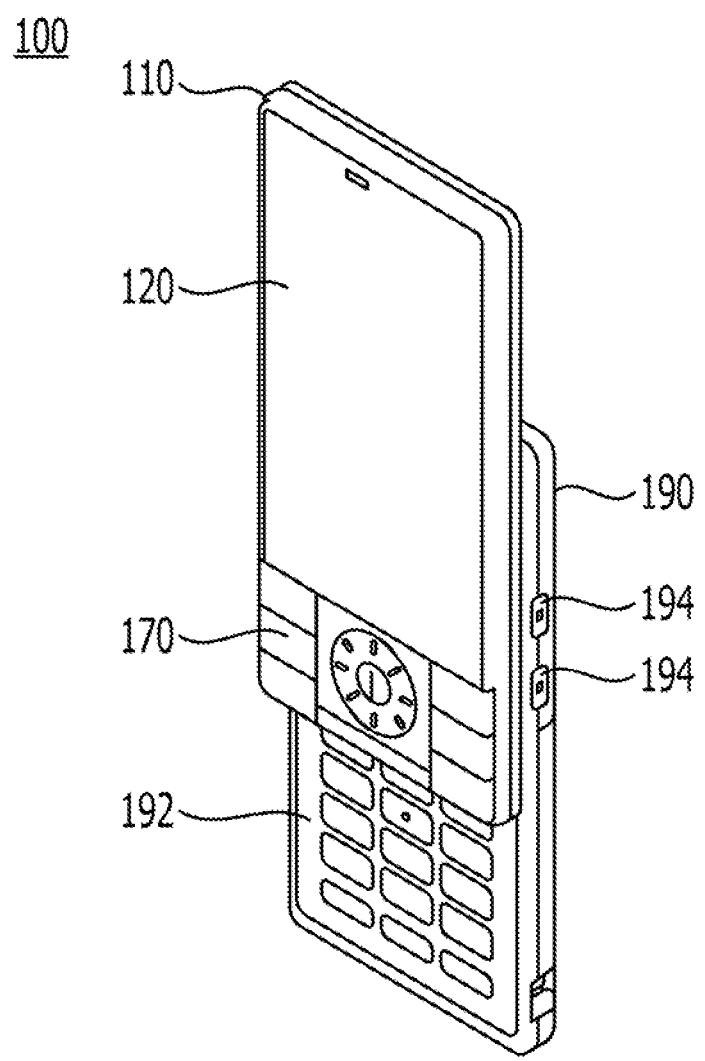
FIG. 2 is a perspective view illustrating the appearance of the cellular phone of the first embodiment in an open state.
Figure 3:
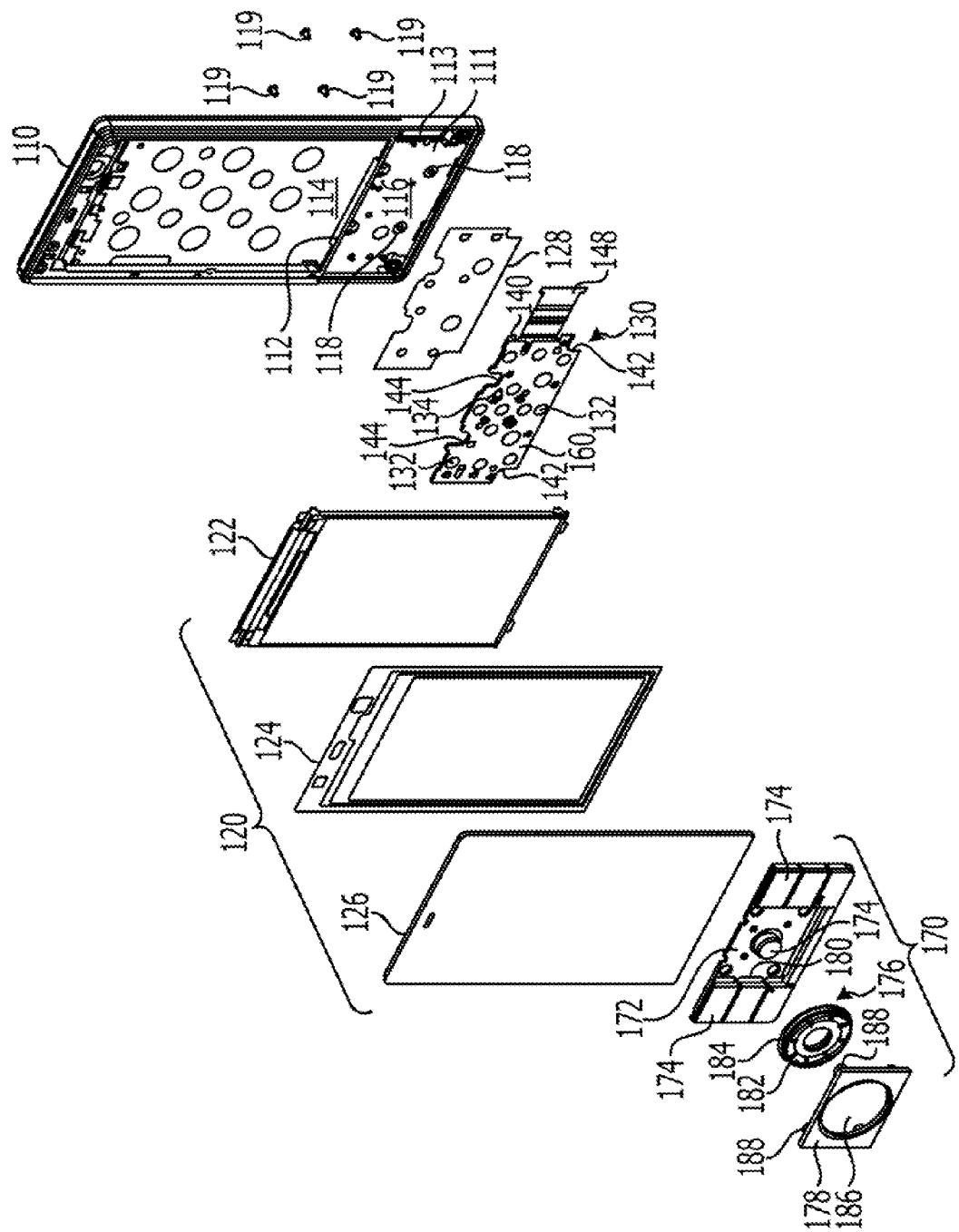
FIG. 3 is an exploded perspective view of the display-side case of the cellular phone of the first embodiment.

FIG. 1 is a perspective view illustrating the appearance of a cellular phone of a first embodiment in a closed state. FIG. 2 is a perspective view illustrating the appearance of the cellular phone of the first embodiment in an open state. FIG. 3 is an exploded perspective view of the display-side case of the cellular phone of the first embodiment. As illustrated in FIGS. 1 and 2, a cellular phone 100 of the first embodiment includes a display-side case 110 and an operation-side case 190. The display-side case 110 and the operation-side case 190 are connected by a slide module so as to be able to slide relative to each other. FIG. 1 illustrates a closed state where the display-side case 110 is not slid, and the display-side case 110 and the operation-side case 190 are entirely superimposed on each other. FIG. 2 illustrates an open state where the display-side case 110 is slid, and the overlap between the display-side case 110 and the operation-side case 190 is minimized.

As illustrated in FIG. 3, one face of the display-side case 110 is open. The display-side case 110 is provided with a partition wall 111 that divides the interior space of the display-side case 110 into an opening-side space and a bottom-side space. On the opening-side surface of the partition wall 111, a partition wall 112 is erected that divides the opening-side space into two spaces along the sliding direction of the cellular phone. The partition wall 112 divides the opening-side space into a first space 114 and second space 116 that accommodate components. The first space 114 accommodates a display portion 120. The second space 116 accommodates a printed board module 130 and a front key module 170 disposed on the printed board module 130. The printed board module 130 is bonded to the surface of the partition wall 111 with double-sided tape 128. The front key module 170 is an operation module for performing various operations of the cellular phone 100. The display portion 120 and the front key module 170 form an open surface of the display-side case 110.

The display portion 120 has a display module 122, a packing 124, and a display panel 126 such as a liquid crystal panel. The display module 122 is accommodated on the outer side of the partition wall 111. The display panel 126 is superimposed over the display module 122 with the packing 124 therebetween. The packing 124 is sandwiched between the display panel 126 and the display module 122 and seals the periphery of the display surface of the display module 122. Thus, foreign matter may be prevented from getting into the space between the display panel 126 and the display surface of the display module 122. The packing 124 spaces the display panel 126 from the display surface of the display module 122 and prevents blurring or the like caused by contact between the display surface and the display panel 126.

The printed board module 130 includes a key flexible board 140 and a top tape 160. The key flexible board 140 is bonded to the surface of the partition wall 111 with the double-sided tape 128. The top tape 160 is bonded to and covers the front key module 170 side surface of the key flexible board 140. The key flexible board 140 is a flexible printed board formed of PET sheet or the like. On the key flexible board 140, a wiring pattern is formed, and a plurality of contact switches such as metal domes 132 and various components such as LEDs (Light Emitting Diodes) 134 are mounted. A flexible printed board is a kind of printed board.

The key flexible board 140 is substantially rectangular in shape and has cutouts 142 at the corners at both ends of a long side thereof. On the other long side, cutouts 144 for passing screws 119 are formed. A key flexible cable 148 extends from one of the short sides of the key flexible board 140 toward the outside of the key flexible board 140. The top tape 160 is formed of PET sheet or the like. The top tape 160 has component holes corresponding to the various components such as LEDs 134 mounted on the key flexible board 140 and is bonded to and covers the surface of the key flexible board 140 and the surfaces of the metal domes 132.

The front key module 170 includes a rectangular key rubber 172 bonded to the printed board module 130, and a plurality of key tops 174 bonded to the key rubber 172. The front key module 170 includes a multidirectional input unit 176 bonded to the key rubber 172, and a cover 178 provided on the key rubber 172.

The key tops 174 are bonded to the key rubber 172 along the three sides of the key rubber 172. The key tops 174 each have a flange 180. The flanges 180 protrude from the sides of the key tops 174 facing the middle of the key rubber 172 toward the middle of the key rubber 172. The multidirectional input unit 176 includes a torus-shaped base portion 182 and a flange 184 protruding from the outer periphery of the base portion 182. The multidirectional input unit 176 is bonded to substantially the center of the key rubber 172. The multidirectional input unit 176 is an input unit including a rotating operation type encoder capable of rotating operation, depressing operation, and inclining operation.

The cover 178 is a rectangular plate with a through-hole 186 in its center. The base portion 182 of the multidirectional input unit 176 is passed through the through-hole 186. The cover 178 has screw holes 188 at the four corners of the display-side case 110 side surface thereof. By inserting screws 119 into screw through-holes 118 formed in the back surface of the display-side case 110 and screwing the screws 119 into the screw holes 188, the cover 178 is fixed to the display-side case 110. The cover 178 fixed to the display-side case 110 is in contact with the flanges 180 of the key tops 174 and the flange 184 of the multidirectional input unit 176 and prevents the key tops 174 and the multidirectional input unit 176 from coming off.

The operation-side case 190 accommodates a key module 190 for performing various operations of the cellular phone 100. The operation-side case 190 accommodates a main body printed board module on which are mounted components that perform various processing such as signal processing in connection with communication of the cellular phone 100, and signal processing for displaying characters or an image on the display panel. On the side of the operation-side case 190, operation keys 194, for example, for speaker volume control are provided.

As illustrated in FIGS. 1, 2, and 3, the key structure of the cellular phone 100 of the first embodiment is a flangeless key structure in which no flanges are provided on the display-side case 110 side of the key tops 174. The key structure of the cellular phone 100 of the first embodiment is a ribless key structure in which no rib (part of the display-side case 110) is provided between adjacent key tops 174. While recent cellular phones are required to be small in size and thickness, the key tops 174 thereof are required to be large so that key operation may be easily performed. The cellular phone 100 of the first embodiment has the flangeless structure and ribless structure and has large key tops 174 so that key operation may be easily performed. In the cellular phone 100 of the first embodiment, in order to reduce the thickness of the cellular phone 100, a key rubber 172 is bonded to a printed board module 130, and key tops 174 are bonded to the key rubber 172.

In a cellular phone 100 having the flangeless structure and ribless structure such as the first embodiment, the key tops 174 are not locked in the display-side case 110, and therefore the key rubber 172 may peel off of the printed board module 130. The key flexible cable 148 extends from the end of the key flexible board 140 in the direction of the side of the display-side case 110, passes through a gap 113 formed between the end face of the partition wall 111 and the side of the display-side case 110, and leads to the reverse side of the partition wall 111. Thus, the key flexible cable 148 has a folded portion 148a located in the gap 113. The folded portion 148a bends due to the weight of the key flexible cable 148. If another member, for example, the slide module of the cellular phone, is provided in this bending direction, the folded portion 148a may come into contact with the other member due to the reaction force of the flexible cable, and may be pressed toward the key rubber 172. The folded portion 148a pressed by the other member presses the key rubber 172, and as a result, the key rubber 172 may peel off of the printed board module 130. The details of the printed board module 130 and the front key module 170 of the cellular phone 100 of the first embodiment to deal with this problem will be described.

Figure 4:
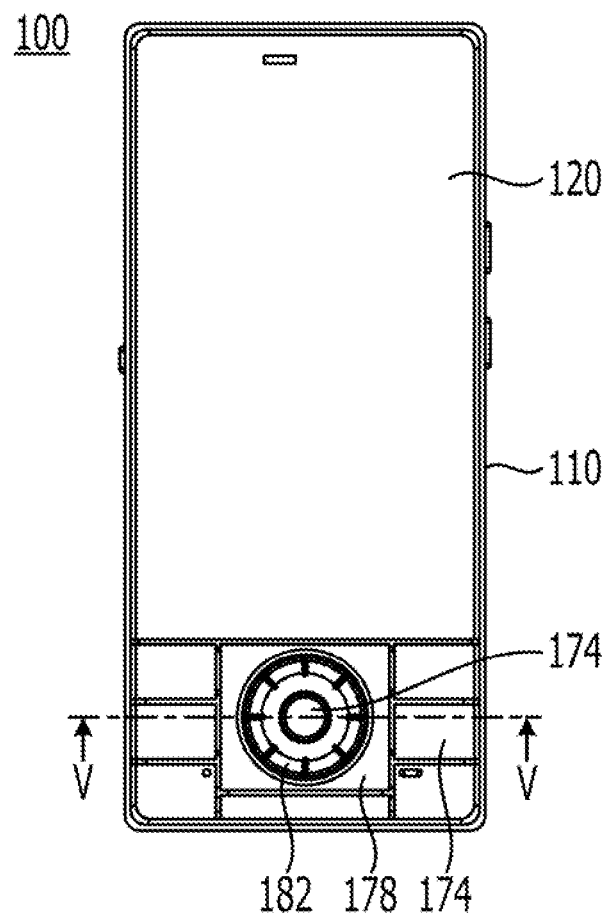
FIG. 4 is a plan view of the cellular phone of the first embodiment.
Figure 5:
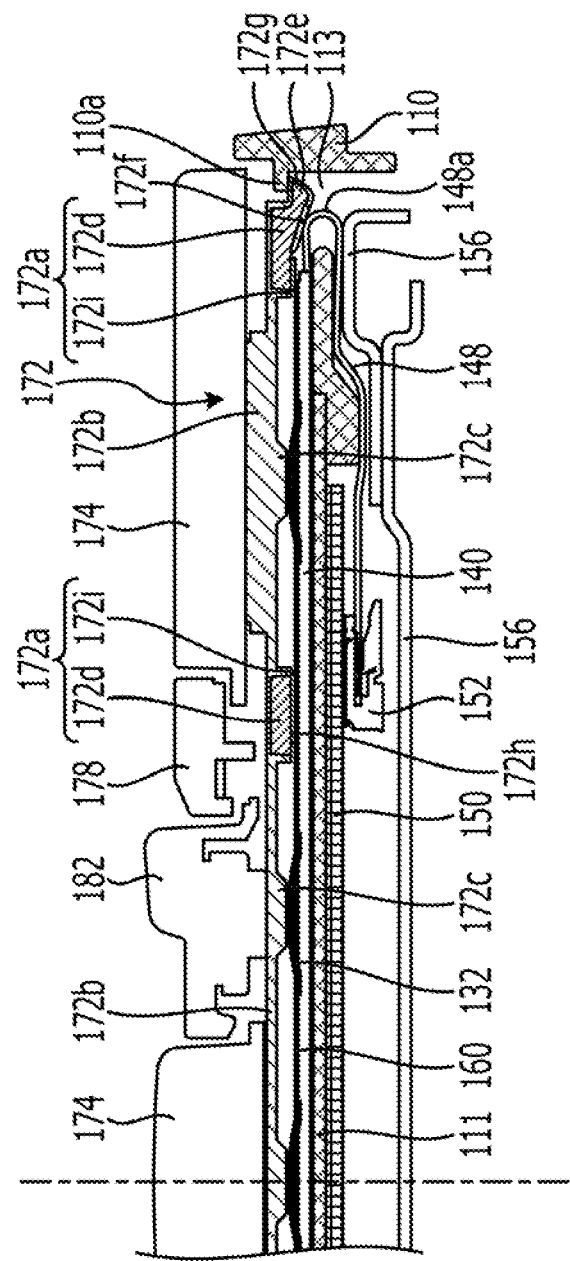
FIG. 5 is a sectional view illustrating part of the section of the cellular phone of FIG. 4 taken along line V-V.
Figure 6:
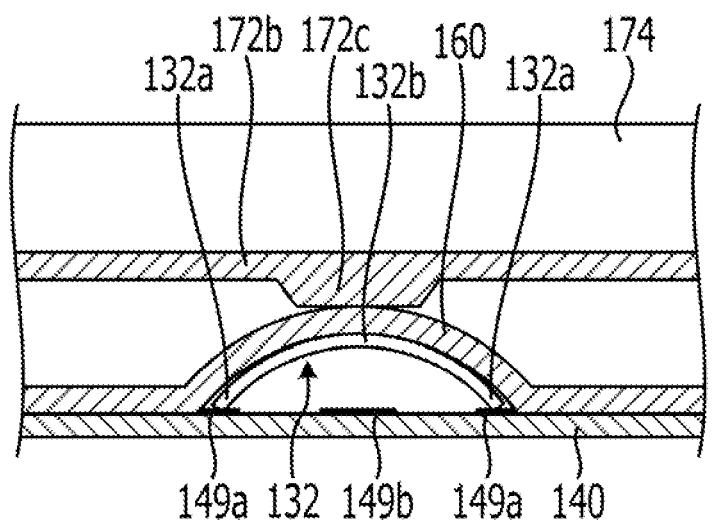
FIG. 6 is a sectional view of a dome switch portion of a printed board module.
Figure 7:
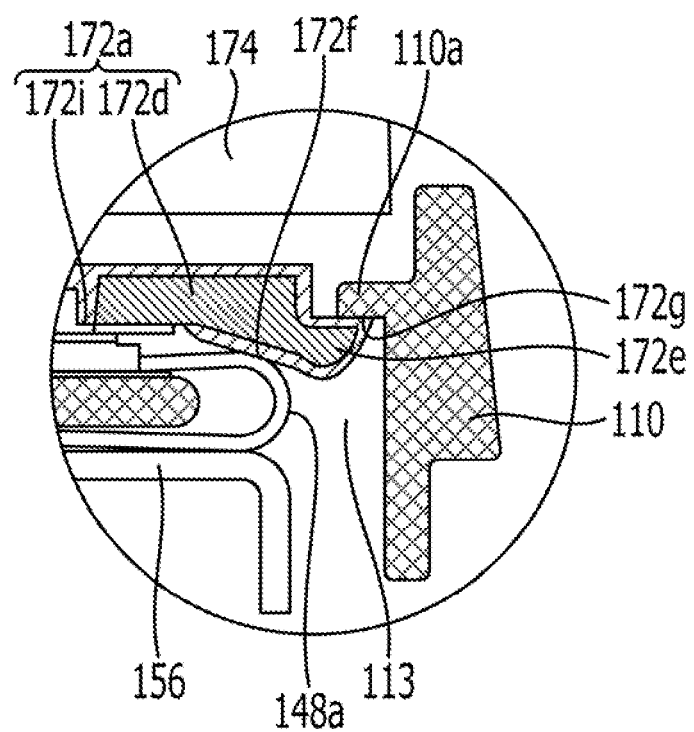
FIG. 7 is an enlarged view of a locking pawl portion of the first embodiment.

FIG. 4 is a plan view of the cellular phone of the first embodiment. FIG. 5 is a sectional view illustrating part of the section of the cellular phone of FIG. 4 taken along line V-V. FIG. 6 is a sectional view of a dome switch portion of a printed board module. FIG. 7 is an enlarged view of a locking pawl portion of the first embodiment. FIG. 5 illustrated the section of the cellular phone 100 taken along line V-V of FIG. 4. For convenience in description, FIG. 5 illustrates the section from the center of the multidirectional input unit 176 to one side of the display-side case 110.

As illustrated in FIG. 5, the key rubber 172 has planar portions 172b opposite to the metal domes 132 provided on the key flexible board 140. The key rubber 172 has supporting portions 172a that floatingly support the planar portions 172b at the ends of the top tape 160 and the flat portions of the top tape 160 where the metal domes 132 are not provided. The key rubber 172 has pushers 172c that are protrusions formed at positions on the metal dome 132 side surfaces of the planar portions 172b corresponding to the metal domes 132. The bottom surfaces of the supporting portions 172a are bonded to the top tape 160 with double-sided tape 172h. Key tops 174 are bonded to the surfaces of the planar portions 172b opposite to the surfaces on which the pushers 172c are formed.

The key rubber 172 is entirely formed of an elastic material. In each supporting portion 172a, a resin portion 172d formed of a resin material is provided. In other words, each supporting portion 172a is integrally formed by a resin portion 172d and an elastic portion 172i formed of an elastic material around the resin portion 172d. The resin portion 172d may be formed, for example, of polycarbonate.

As illustrated in FIG. 6, the top tape 160 to which the tops of the metal domes 132 are preliminarily bonded is bonded to the key flexible board 140. On the component disposing surface of the key flexible board 140, a first contact 149a is formed at a position corresponding to the edge 132a of each metal dome 132, and a second contact 149b is formed at a position corresponding to the top 132b of each metal dome 132. The top 132b of each metal dome 132 is bonded to the key flexible board 140 side surface of the top tape 160. The top tape 160 is bonded to the key flexible board 140 such that the edge 132a of each metal dome 132 is in contact with the corresponding first contact 149a.

Normally, the edge 132a of each metal dome 132 and the corresponding first contact 149a are in contact with each other, and the top 132b of each metal dome 132 and the corresponding second contact 149b are out of contact with each other. Therefore, the first contact 149a and the second contact 149b are electrically isolated from each other. When any one of the key tops 174 is depressed by a user, the corresponding pusher 172c presses the top 132b of the corresponding metal dome 132 with the top tape 160 therebetween, and the metal dome 132 deforms such that the top 132b crushes. As a result, the top 132b of the metal dome 132 comes into contact with the second contact 149b, and the first contact 149a and the second contact 149b are electrically connected. When the user stops depressing the key top 174, the metal dome 132 returns to its original shape, and the first contact 149a and the second contact 149b are electrically isolated from each other again. In the first embodiment, the contact switches mounted on the key flexible board 140 are metal domes. However, other types of contact switches, for example, cantilever spring contact switches may also be used.

Returning to FIG. 5, a printed board 150 is provided on the reverse side of the partition wall 111. On the printed board 150, pattern wiring is formed and a connector 152 is mounted. The key flexible cable 148 extends from the end of the key flexible board 140 in the direction of the side of the display-side case 110, passes through a gap 113 formed between the end face of the partition wall 111 and the side of the display-side case 110, and leads to the reverse side of the partition wall 111. Thus, the key flexible cable 148 has a folded portion 148a located in the gap 113. The key flexible cable 148 is folded at the folded portion 148a toward the reverse side of the partition wall 111 and is connected to the connector 152.

As illustrated in FIGS. 5 and 7, a slide module 156 for sliding the display-side case 110 and the operation-side case 190 relative to each other is provided on the reverse side of the partition wall 111. The folded portion 148a is pressed toward the key rubber 172 by the reaction force of the flexible cable 148 generated by contacting the slide module 156. From the supporting portion 172a formed at the end of the key rubber 172, a locking pawl 172e extends in the direction of the side of the display-side case 110. The locking pawl 172e has a contact portion 172f that is in contact with the folded portion 148a being pressed by the slide module 156. On the surface opposite to the contact portion 172f of the locking pawl 172e, a locking portion 172g may formed that may engage with a protrusion 110a formed on the inner wall of the side of the display-side case 110. The first embodiment has been described with an example in which the folded portion 148a is in contact with and pressed by the slide module 156. The first embodiment may also be applied to the case where the folded portion 148a is in contact with and pressed by another member provided in the bending direction of the folded portion 148a.

In the cellular phone 100 of the first embodiment, the planar portions 172b, the supporting portions 172a, the pushers 172c, and the locking pawl 172e are integrally formed of an elastic material. The supporting portion 172a at the end of the key rubber 172 and the locking pawl 172e are integrally formed by a resin portion 172d and an elastic portion 172i formed of an elastic material around the resin portion 172d.

According to the cellular phone 100 of the first embodiment, the key rubber 172 may be prevented from peeling off due to the pressure of the folded portion 148a of the key flexible cable 148. Because the slide module 156 is provided in the direction in which the folded portion 148a of the key flexible cable 148 bends due to the weight of the key flexible cable 148, the folded portion 148a is pressed toward the key rubber 172 by the reaction force of the flexible cable 148 generated by contacting the slide module 156. The pressed folded portion 148a comes into contact with the contact portion 172f of the locking pawl 172e and presses the key rubber 172 in the direction in which the key rubber 172 peels off of the printed board module 130. Because the locking portion 172g is formed on the surface opposite to the contact portion 172f of the locking pawl 172e, the locking portion 172g engages with the protrusion 110a formed on the inner wall of the side of the display-side case 110. Because the pressing force from the folded portion 148a is applied to the protrusion 110a, the force peeling the key rubber 172 is reduced.

According to the cellular phone 100 of the first embodiment, the key rubber 172 may be prevented from peeling off due to the pressure of the folded portion 148a of the key flexible cable 148.

According to the cellular phone 100 of the first embodiment, the need to separately providing a member for preventing the key rubber 172 from peeling off due to the pressure of the folded portion 148a, for example, on the key flexible board 140 is eliminated. Therefore, the first embodiment may contribute to the reduction in thickness of the cellular phone 100. The member for preventing the key rubber 172 from peeling off is formed, for example, of resin. In the cellular phone 100 of the first embodiment, the printed board module 130 and the key rubber 172 may be fixed to each other by providing a locking pawl 172e without depending only on the adhesion force of the double-sided tape 172h. According to the cellular phone 100 of the first embodiment, because the locking portion 172g is formed by the elastic portion 172i, noise may be prevented from being generated even if the locking portion 172g and the protrusion 110a rub together. According to the cellular phone 100 of the first embodiment, because the locking portion 172g is formed by the elastic portion 172i, and the elastic portion 172i serves as a cushion, the dimension tolerance may be set within a wide range.

[Second Embodiment]

Figure 8:
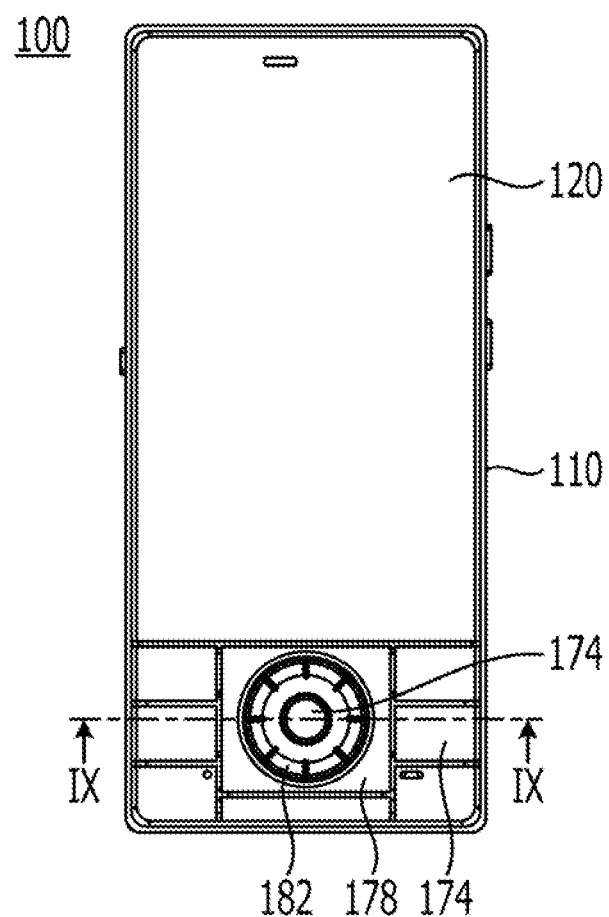
FIG. 8 is a plan view of a cellular phone of a second embodiment.
Figure 9:
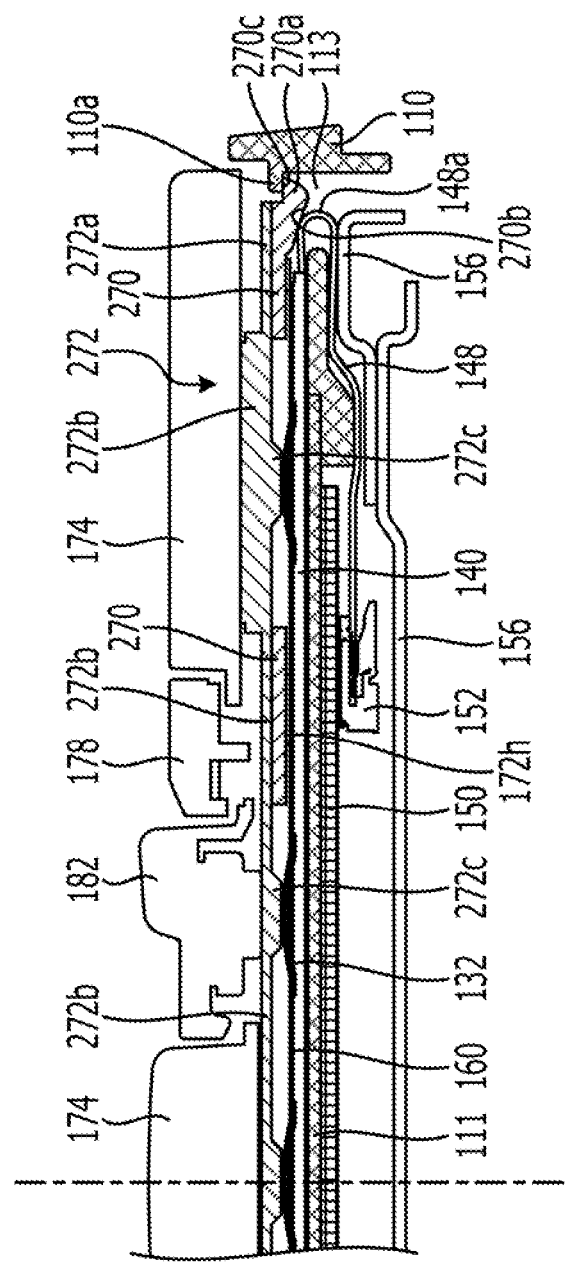
FIG. 9 is a sectional view illustrating part of the section of the cellular phone of FIG. 8 taken along line IX-IX.
Figure 10:
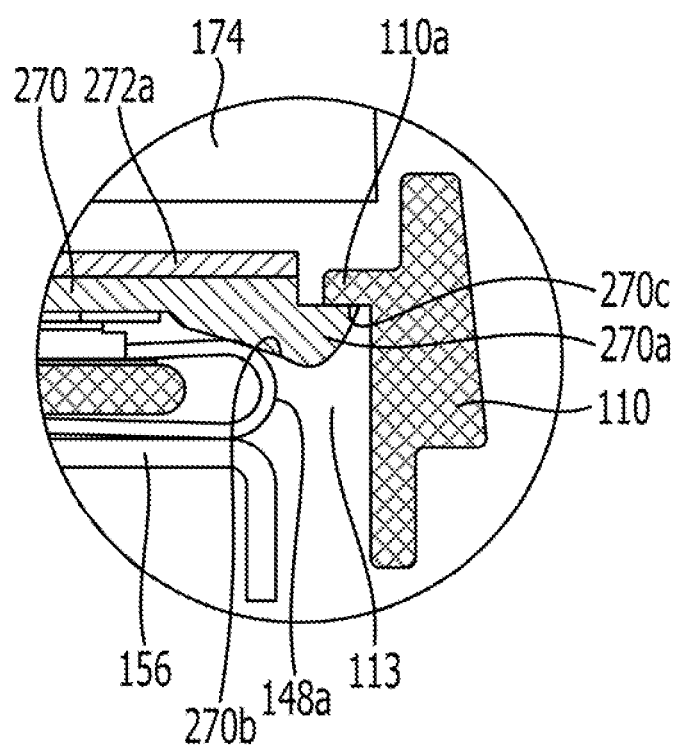
FIG. 10 is an enlarged view of a locking pawl portion of the second embodiment.

FIG. 8 is a plan view of a cellular phone of a second embodiment. FIG. 9 is a sectional view illustrating part of the section of the cellular phone of FIG. 8 taken along line IX-IX. FIG. 10 is an enlarged view of a locking pawl portion of the second embodiment. The second embodiment differs from the first embodiment in the configuration of the key rubber. The other components are the same as those of the first embodiment, and the redundant description thereof will be omitted.

As illustrated in FIG. 9, a key rubber 272 has planar portions 272b opposite to the metal domes 132 provided on the key flexible board 140. The key rubber 272 has pushers 272c that are protrusions formed at positions on the metal dome 132 side surfaces of the planar portions 272b corresponding to the metal domes 132. On the top tape 160, supporting portions 270 are provided that floatingly support the planar portions 272b at the ends of the top tape 160 and the flat portions of the top tape 160 where the metal domes 132 are not provided. The supporting members 270 are bonded to the top tape 160 with double-sided tape 172h. The planar portions 272b are bonded to and cover the supporting portions 270. Key tops 174 are bonded to the surfaces of the planar portions 272b opposite to the surfaces on which the pushers 272c are formed. The supporting portions 270 may be formed, for example, of polycarbonate.

As illustrated in FIGS. 9 and 10, from the supporting portion 270 bonded to the end of the top tape 160, a locking pawl 270a extends in the direction of the side of the display-side case 110. The locking pawl 270a has a contact portion 270b that is in contact with the folded portion 148a being pressed by the slide module 156. On the surface opposite to the contact portion 270b of the locking pawl 270a, a locking portion 270c may formed that may engage with a protrusion 110a formed on the inner wall of the side of the display-side case 110. The second embodiment has been described with an example in which the folded portion 148a is in contact with and pressed by the slide module 156. The second embodiment may also be applied to the case where the folded portion 148a is in contact with and pressed by another member provided in the bending direction of the folded portion 148a.

In the cellular phone of the second embodiment, the supporting portions 270 and the locking pawl 270a are integrally formed of a resin material. The planar portions 272b and the pushers 272c are integrally formed of an elastic material. A resin portion integrally formed by the supporting portions 270 and the locking pawl 270a and an elastic portion integrally formed by the planar portions 272b and the pushers 272c are formed separately. The elastic portion is bonded to the resin portion.

According to the cellular phone 100 of the second embodiment, the key rubber 272 may be prevented from peeling off due to the pressure of the folded portion 148a of the key flexible cable 148. Because the slide module 156 is provided in the direction in which the folded portion 148a of the key flexible cable 148 bends due to the weight of the key flexible cable 148, the folded portion 148a comes into contact with the slide module 156 and is pressed toward the key rubber 272. The folded portion 148a pressed by the slide module 156 comes into contact with the contact portion 270b of the locking pawl 270a and presses the key rubber 272 in the direction in which the key rubber 272 peels off of the printed board module 130. Because the locking portion 270c is formed on the surface opposite to the contact portion 270b of the locking pawl 270a, the locking portion 270c engages with the protrusion 110a formed on the inner wall of the side of the display-side case 110. Because the pressing force from the folded portion 148a is applied to the protrusion 110a, the force peeling the key rubber 272 is reduced. According to the cellular phone 100 of the second embodiment, the key rubber 272 may be prevented from peeling off due to the pressure of the folded portion 148a of the key flexible cable 148.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. An electronic device comprising:
    a case including a fixing portion;
    a printed board fixed to the fixing portion;
    a key rubber provided with key tops and fixed to the printed board; and
    a flexible cable attached to the printed board and bent, in a direction different from the surface of the fixing portion to which the printed board is fixed, to create a folded portion of the flexible cable,
    wherein the key rubber includes a contact portion that is in contact with the folded portion of the flexible cable and subjected to a reaction force effected through the bending of the flexible cable, and a locking portion pressed against the case by the reaction force,
    wherein the locking portion is formed on a surface opposite to the contact portion of the key rubber and presses against a protrusion formed on an inner wall of the case by the reaction force.

2. An electronic device comprising:
    a case including a fixing portion;
    a printed board fixed to the fixing portion;
    a key rubber provided with key tops and fixed to the printed board; and
    a flexible cable attached to the printed board and bent, in a direction different from the surface of the fixing portion to which the printed board is fixed, to create a folded portion of the flexible cable, wherein the key rubber includes a contact portion that is in contact with the folded portion of the flexible cable and subjected to a reaction force effected through the bending of the flexible cable, and a locking portion pressed against the case by the reaction force, wherein the locking portion has an elastic member.

* * * * *